United States Patent [19]

Lay

[11] 3,923,933
[45] Dec. 2, 1975

[54] PROCESS FOR PREPARING SINTERED URANIUM DIOXIDE GRAINS

[75] Inventor: Kenneth W. Lay, Schenectady, N.Y.

[73] Assignee: General Electric Company, Schenectady, N.Y.

[22] Filed: Oct. 9, 1973

[21] Appl. No.: 404,436

Related U.S. Application Data

[63] Continuation of Ser. No. 172,291, Aug. 16, 1971, which is a continuation of Ser. No. 771,642, Oct. 29, 1968, abandoned.

[52] U.S. Cl.............. 264/.5; 252/301.1 R; 423/255; 423/261
[51] Int. Cl.............................................. G21c 21/00
[58] Field of Search................. 264/.5; 252/301.1 R; 423/260, 261, 255

[56] References Cited
UNITED STATES PATENTS
3,573,036   3/1971   Fairbanks et al. ................. 264/.5 X

*Primary Examiner*—Stephen J. Lechert, Jr.
*Attorney, Agent, or Firm*—Jane M. Binkowski; Joseph T. Cohen; Jerome C. Squillaro

[57] ABSTRACT

Uranium dioxide powder is prepared for use as fuel in nuclear reactors by forming it into compacts of any convenient size, and sintering these compacts at a temperature of at least about 1900°C until grains of the desired size are formed in the compacts. The heating is carried out in an atmosphere of dry hydrogen having a dewpoint sufficient to produce substoichiometric uranium dioxide. The sintered compacts are then cooled in an atmosphere of hydrogen at a rate sufficient to precipitate uranium on the grain boundaries. The precipitated uranium reacts with the hydrogen in the atmosphere to form uranium hydride, causing a significant volume increase which disintegrates the compacts into substantially the grains formed therein.

9 Claims, No Drawings

PROCESS FOR PREPARING SINTERED URANIUM DIOXIDE GRAINS

This is a continuation of application Ser. No. 172,291, filed Aug. 16, 1971 which is a Continuation of application Ser. No. 771,642 filed Oct. 29, 1968, now abandoned. PROCESS FOR PREPARING SINTERED URANIUM DIOXIDE GRAINS The present invention relates generally to the sintering art and is more particularly concerned with a novel method for producing sintered uranium dioxide grains of controlled sized for use as nuclear fuel.

The use of uranium dioxide as a nuclear fuel presents a number of problems, especially when the reactor is comprised of a number of long, narrow tubes packed with the nuclear fuel. Since uranium dioxide has poor thermal conductivity, it must be packed into the reactor tube so that there is little void space. Unfortunately, uranium dioxide is produced commercially as a fine, fairly porous powder which cannot be used directly as nuclear fuel. It is not a free-flowing powder but clumps and agglomerates, making it difficult to pack the tube to the desired density. In addition, the porosity of the individual particles is usually too high for satisfactory thermal conductivity.

The specific composition of this commercial uranium dioxide also prevents it from being used directly as a nuclear fuel. Uranium dioxide is an exception to the law of definite proportions since "$UO_2$" actually denotes a single, stable phase that may vary in composition from $UO_{1.7}$ to $UO_{2.25}$. Because thermoconductivity decreases with increasing O/U ratios, uranium dioxide having as low an O/U ratio as possible is preferred. However, since uranium dioxide powder oxidizes easily in air and absorbs moisture readily, the O/U ratio of this powder is significantly in excess of that acceptable for fuel. As a practical matter, the industry has adopted a ratio of 2.00, since it can be consistently produced in commercial sintering operations. Nuclear reactors, therefore, are generally designed for fuels having an O/U ratio preferably of 2.00 but suitably as high as 2.01.

A number of methods have been used to make uranium dioxide suitable as a fuel. Presently, it is usually pressed into cylindrically-shaped compacts of specific size which are sintered in an atmosphere of wet hydrogen at a temperature of about 1700°C. This sintering operation is designed to densify the compacts and bring them down to the proper O/U ratio. Wet hydrogen gas is used because its water vapor accelerates the sintering rate thereby allowing the use of correspondingly lower sintering temperatures.

Such a method of sintering has a number of inherent disadvantages. The powder must first be carefully compressed to a compact of the proper size and shape. All of the sintered compacts must be quite close to the same size, i.e. the particular size required by the reactor, so that they can be packed into the reactor tube with a minimum of void space. Those compacts not of the proper size must be mechanically ground to the correct size thereby entailing an extra processing step as well as a health hazard by the resulting dust. In addition, these specifically sized compacts must be carefully packed in the reactor to provide as high an overall density in the tube as possible.

There are methods directed to preparing uranium dioxide as a fuel in particle form. However, all these methods include grinding of the sintered or fused compacts or pellets of uranium dioxide to the required particle size. One inherent disadvantage of a grinding operation is that it is difficult to produce particles of the desired size, especially particles of a fine size. Generally, the grinding operation must be followed by a screening procedure to recover the particles of the desired size. Besides the problems of dust and handling, grinding of the uranium dioxide fuel material results in particles having a chipped structure which is unsatisfactory since it prevents them from being free-flowing and from being packed into the nuclear reactor to the proper density.

The present invention overcomes the aforementioned disadvantages. It provides a method of preparing sintered uranium dioxide grains of controllable size which are free-flowing and which can be packed to the desired density in the reactor tube more easily than prior art sintered or otherwise treated material. In the present process the powder need only be compressed into compacts of any convenient size since these compacts will later be disintegrated into particle form. The careful initial compression of the powder into specifically shaped compacts of the prior art processes is therefore eliminated. One of the particular advantages of the present process is that it produces sintered grains of controlled size which are substantially equiaxed. There is, therefore, no need for a grinding or screening operation and the problem of chipping is not encountered. Since the present product is free-flowing it can be combined readily with other materials if desired.

Another advantage of the present invention is that sintered grains are produced which can be packed easily to the desired density in the reactor tube by a number of conventional techniques. For example, the present process can be operated to produce large grains as well as small grains. These grains can be packed into the reactor tube with a vibrator so that the smaller grains fill the interstices between the larger grains to produce a satisfactorily dense fuel.

Briefly stated, the process of the present invention comprises pressing uranium dioxide powder into compacts and heating these compacts at a temperature of at least about 1900°C until grains of the desired size are formed therein. This heating is carried out in a dry hydrogen atmosphere wherein the hydrogen gas dewpoint is sufficient to produce substoichiometric uranium dioxide at the sintering temperature. The sintered compacts are then cooled in hydrogen at a rate sufficient to precipitate uranium on the grain boundaries. The precipitated uranium reacts with the hydrogen in the atmosphere to form uranium hydride, causing a significant volume increase which disintegrates the compacts into substantially the formed grains.

In the present process, the initial stoichiometry of the uranium dioxide used can vary widely, i.e. the O/U ratio of the uranium dioxide will be greater than 2.00 in almost every instance.

The uranium dioxide powder used in the present sintering process need only be of a size which is sinterable. For most applications, it will have a surface area ranging generally from about 2 to 12 square meters per gram. Such particles allow the sintering to be carried out within a reasonable length of time and at temperatures practical for commercial applications. Particles having a smaller surface area can be used, but they require higher sintering temperatures, whereas particles having a larger surface area are difficult to handle because of their high chemical reactivity.

To carry out the present process, the powder is initially compressed into compacts of any desired size and convenient form. The compacts need only be compressed sufficiently so that they have the required mechanical strength for handling. Any conventional compression technique can be used such as isostatic compression or methods employing steel dies.

For most commercial applications the sintering temperature may range from about 1900°C to about 2200°C. Temperatures as low as about 1800°C may be used, but such a temperature requires a significantly longer heating period before the material will reduce to the substoichiometric form essential to the precipitation of uranium during subsequent cooling. On the other hand, temperatures higher than about 2200°C do not afford an advantage which is sufficient to warrant their use. The theoretical maximum sintering temperature would be the melting point of the uranium dioxide.

Since relatively high temperatures are used in the instant process, the sintering furnace should be made of a refractory material such as molybdenum. In addition, the furnace atmosphere should be controllable so that only the desired gas atmosphere is present during sintering. Specifically, the introduction of oxygen and water to the furnace atmosphere should be prevented. Prior to sintering, the furnace should be flushed with an inert gas such as nitrogen to remove any entrained air which would affect the O/U ratio adversely. Also, unless the furnace is provided with introducing means such as gas locks which can place the uranium dioxide into the furnace without affecting its atmosphere, the uranium dioxide should be placed into the furnace prior to flushing with the inert gas.

In the present process, the sintering of the uranium dioxide is carried out in an atmosphere of dry hydrogen. By "dry hydrogen" is meant hydrogen gas sufficiently dry to reduce the uranium dioxide to substoichiometric form, i.e. $UO_{2-x}$, in the sintering operation. Specifically, the hydrogen gas dewpoint depends somewhat upon the particular sintering temperature used in that the higher the sintering temperature, the higher can be the dewpoint of the gas. For sintering temperatures ranging from about 1900°C to about 2200°C, hydrogen gas having a dewpoint of about −40°C is satisfactory.

The flow of hydrogen gas through the sintering furnace should be sufficiently rapid that the uranium dioxide is reduced to substoichiometric composition. The specific flow rate of the gas depends on the size of the furnace loading and somewhat on the temperature. The slower the gas flow rate the longer is the heating period required for the same uranium oxide reduction result.

In the present process, the uranium dioxide compacts are heated at the sintering temperature until the grains formed in the compacts are of the desired size. The compacts then are cooled in hydrogen at a rate sufficiently rapid to precipitate uranium at the grain boundaries. The quantity of hydrogen used during cooling need only be sufficient to react with the precipitated uranium to form uranium hydride which occurs generally at temperatures below about 400°C. When uranium hydride forms, a significant increase in volume occurs which breaks the compact apart substantially along the grain boundaries forming substantially equiaxial grains or uranium dioxide. When the disintegrated compacts are exposed to air, the uranium hydride oxidizes to uranium dioxide having an O/U ratio of 2.00 or very close thereto.

The specific rate of cooling is determinable empirically. If the sintered compacts are cooled too slowly, uranium will precipitate but will form into large clumps which will not surround the grain boundaries sufficiently. On the other hand, where large grains are formed, if the compacts are cooled too rapidly there may not be sufficient time for the uranium to diffuse to the grain boundaries. Generally, a cooling rate of about 100 to 300 centigrade degrees per minute is satisfactory. The rapid cooling rate of the present process is in direct contrast to that of the prior art processes which employ a relatively slow cooling rate.

A number of conventional cooling techniques may be used. For example, for small loads the power to the furnace may be shut off and the compacts allowed to cool in the furnace. On the other hand, the compacts could be withdrawn from the hot zone of the furnace into another zone containing hydrogen slowly enough to allow formation of uranium hydride below about 400°C.

The cooling of the sintered compacts may also be carried out by a two-step technique wherein the sintered compacts are initially cooled in a gas other than hydrogen, i.e. an inert gas, until just above about the temperature at which uranium hydride forms and then continuing the cooling in hydrogen to allow formation of the uranium hydride. For commercial applications, however, the use of such a twostep technique is not preferred.

The size of the grains produced by the present process can be predetermined in a number of ways. For example, a number of runs can be carried out at the same sintering temperature, but for various time periods, and the size of the resulting grains plotted against sintering time. Another method would be to carry out a number of runs within the same time period, but a various sintering temperatures, and the size of the resulting grains plotted against sintering temperature.

By another method, grain growth can be determined before the compacts are disintegrated. Specifically, the uranium dioxide compacts are sintered for a specific period of time and then cooled in hydrogen to a temperature above that required for the formation of uranium hydride, preferably cooling to a temperature of about 1000°C, and then completing the cooling in an inert gas such as nitrogen to prevent formation of uranium hydride and disintegration of the compacts. Grain growth in the cooled compacts can be measured metallographically using standard procedures. This same method can also be used to determine the presence of uranium at the grain boundaries. The size of the grains is an indication to what extent sintering should be continued, and the compacts can then be reheated for additional sintering at the same sintering temperature, or a higher sintering temperature as desired.

It is possible that during sintering the desired grain growth may be attained before the substoichiometric uranium dioxide forms. In such instance, the compacts will not disintegrate during cooling since no uranium hydride forms. To increase the rate of reduction of the uranium dioxide to substoichiometric form before the desired grain growth occurs, a number of techniques can be employed such as the use of a higher sintering temperature or perhaps the use of uranium dioxide with a lower O/U ratio.

If desired, certain materials can be added to the uranium dioxide powder before it is formed into a compact to accelerate grain growth. Any material that forms a eutectic can be used to accelerate grain growth, i.e. any material which promotes the formation of a liquid around the uranium dioxide particle in the compact during sintering. Representative of such grain growth accelerators are aluminum oxide, magnesium oxide, beryllium oxide, and titanium dioxide. The grain growth accelerator is generally used in very small amounts, i.e. from about 0.1 to 1% by weight of the uranium dioxide.

In one embodiment of the present process, ammonium diuranate may be used instead of uranium dioxide. The ammonium diuranate may be formed into compacts in the same manner as the uranium dioxide. However, as the compacts are heated to sintering temperature, the ammonium diuranate converts completely to uranium dioxide and the process, thereafter is the same as that disclosed for uranium dioxide. Additives can also be admixed with the ammonium diuranate to accelerate grain growth.

In another embodiment of the present invention, the uranium dioxide or ammonium diuranate powder may first be admixed with uranium powder, and the resulting mixture compressed into compacts. Additives can also be admixed with the mixture to accelerate grain growth. During sintering, the uranium reacts with the uranium dioxide to form substoichiometric uranium dioxide thereby significantly shortening the period of time required to form this substoichiometric oxide. After sintering, during the cooling procedure, the uranium precipitates out and reacts with the hydrogen to form the uranium hydride which then disintegrates the compacts. The specific amount of uranium used depends largely on the furnace loading and other operating conditions and can be easily determined by trial and error. For example, if the sintering is stopped before the substoichiometric oxide is produced, no uranium will precipitate, and therefore, no uranium hydride will form to disintegrate the compacts. This indicates that a longer heating period or a higher sintering temperature is required.

Generally, in carrying out the process of the present invention, the longer the sintering period and the higher the sintering temperature, the larger are the final sintered grains produced. Since they are whole grains rather than grain fragments, they do not tend to oxidize in air to any significant extent. Additionally, they are freeflowing, substantially spherical, i.e. equiaxial, and can readily be packed in a reactor tube. Generally, their O/U ratio is 2.00.

The invention is further illustrated by the following examples in which, unless otherwise noted, the conditions and procedure were as follows:

The hydrogen gas had a dewpoint of −40°C and the flow rate was 150 ml/min.

The sintering furnace was a molybdenum tube about 10 inches in length and 2 inches in diameter. The furnace heated to the desired sintering temperature in about 10 minutes.

After disintegration, the size of the particles was determined by a standard metallographic method.

The density of the product is given as percent of theoretical. It was determined by a standard technique, i.e. by a differential weight technique by weighing in carbon tetrachloride and in air and calculating the volume from the difference in weight and known density of carbon tetrachloride.

EXAMPLE 1

Uranium dioxide powder having a surface area of about 2 square meters per gram and an O/U ratio of 2.15 was isostatically pressed under a pressure of 30,000 psi to form five compacts about 5 inches in length and 1 inch in diameter. Each of these compacts weighed about 425 grams.

The compacts were broken into smaller compacts to allow loading of about 250–300 grams in the furnace for each firing. The furnace was then flushed with nitrogen for about 10 minutes to remove any entrained air. Hydrogen gas was flowed through the furnace which was then heated to a temperature of about 2070°C and maintained at this temperature for three hours.

At the end of this time, the power to the furnace was shut off and the sintered compacts allowed to cool therein in the hydrogen atmosphere.

During cooling, the compacts disintegrated forming substantially equiaxed particles about 50 microns in size. All of the particles appeared to be of substantially the same size and had a density of 98.2%.

The procedure used in the examples in the following table was substantially the same as that set forth in Example 1 except as noted in the table. In addition, in Examples 3 through 10, the material was pressed by means of a die using a pressure of 55,000 psi.

| Sample No. | Composition | Amount Of Pressed Material Sintered | Sintering Temp. (°C) | Cooling Rate °C/min. | Special Procedure | Product Formed | Product Density |
|---|---|---|---|---|---|---|---|
| 2 | Uranium Dioxide and 0.2wt.% Al$_2$O$_3$ | ~60 gm | 2070 | 3 hr. | 200°/min. | | Disintegrated into ~160 μ particles. | 97.6% |
| 3 | Uranium Dioxide and 0.2wt.% Al$_2$O$_3$ | 0.6 gm (single pellet) | 2100 | 3 hr. | 100°/min. | | Disintegrated into ~180 μ particles. | — |
| 4 | Uranium Dioxide | 0.6 gm (single pellet) | 2100 | 3 hr. | 100°/min. | | Disintegrated into ~60 μ particles. X-ray examination (Debye-Scherrer powder method) showed only uranium dioxide with a$_0$ = 5.4708 A. | — |
| 5 | Uranium Dioxide and 0.6wt.% Al$_2$O$_3$ | 0.6 gm (single pellet) | 2100 | 3 hr. | 100°/min. | Sintering done in H$_2$/H$_2$O atmosphere (dew point = 0°C) | No disintegration. Using standard metallographic procedure, the pellet was sectioned, polished, etched and examined metallographically. It showed a grain size of ~170 μ. | 97.6% |
| 6 | Uranium Dioxide | 0.7 gm (single pellet) | 2100 | 3 hr. | 100°/min. | Sintering done in H$_2$/H$_2$O atmosphere | No disintegration. | 97.2% |

-continued

| Sample No. | Composition | Amount Of Pressed Material Sintered | Sintering Temp. (°C) | | Cooling Rate °C/min. | Special Procedure | Product Formed | Product Density |
|---|---|---|---|---|---|---|---|---|
| 7 | Uranium Dioxide | 0.8 gm (single pellet) | 2100 | 3 hr. | 100°/min. to 1000°C | (dew point = 0°C) Introduced $N_2$ gas during cooling at 1000°C. | No disintegration. Pellet examined as in Example 5. It showed evidence of uranium on the grain boundaries, and grains displayed very low porosity. | 98.2% |
| 8 | Uranium Dioxide and 0.6wt.% $Al_2O_3$ | 0.8 gm (single pellet) | 2100 | 3 hr. | 100°/min. to 1000°C | Introduced $N_2$ gas during cooling at 1000°C. | No disintegration. Pellet examined as in Example 7 showed evidence of uranium on the grain boundaries and grains of very low porosity. | 98.8% |
| 9 | Uranium Dioxide and 0.6wt.% $Al_2O_3$ | 0.7 gm (single pellet) | 2100 | 6 hr. | 100°/min. | | Disintegrated into ~320 μ particles. | — |
| 10 | Ammonium Diuranate and 3.3wt.% $TiO_2$ | 0.7 gm (single pellet) | 2000 | 2 hr. | 300°/min. | | Disintegrated into ~190 μ particles. | — |

Examples 2, 3, 4, 9 and 10 in the table illustrate the present invention. In each of these examples, the sintered pellet or compacts disintegrated to form substantially equiaxed particles of substantially the same size. A comparison of Examples 1 and 4 or 2 and 3, shows that the particular amount of material sintered is not critical. In addition, a comparison of Examples 1 and 2 or 3 and 4 shows the large particles resulting by the addition of a grain growth accelerator for a given heat treatment. A longer heating time allows more grain growth and results in larger particles as shown by Examples 3 and 9. Example 10 illustrates that the present invention is operable with ammonium diuranate as a starting material.

In Examples 5 and 6, the required dry hydrogen sintering atmosphere was not used and no disintegration occurred during cooling in hydrogen. Examples 7 and 8 show that there is also no disintegration if the sintered pellet is not cooled in hydrogen at lower temperatures to allow formation of uranium hydride. A comparison of Examples 3 and 5 illustrates that the size of the particles formed after disintegration is essentially the size of the grains formed in the compact.

The product of the present invention is ordinarily packed in a tube and the resulting sealed article sold in commerce. Specifically, the uranium dioxide is generally packed in tubes open at one end and made of metal such as stainless steel or zirconium alloys. These tubes are typically about one-half or one-fourth inch in diameter and several feet long, i.e. up to about 12 feet long. The tube is ordinarily vibrated to attain packing of the desired density, then evacuated, filled with an inert gas such as helium and sealed by welding a cover on the open end under an inert gas.

What I claim as new and desire to secure by Letters Patent of the United States is:

1. A process of preparing free-flowing substantially equiaxed uranium dioxide nuclear fuel grains of controlled size which comprises pressing powder consisting essentially of uranium dioxide or ammonium diuranate into compacts, sintering said compacts at a temperature of at least about 1900°C until grains of uranium dioxide of the desired size are formed therein, said sintering being carried out in an atmosphere of dry hydrogen having a dewpoint sufficient to produce substoichiometric uranium dioxide, and cooling said sintered compacts in an atmosphere of hydrogen at a rate of about 100 to 300 Centigrade degree per minute to precipitate metallic uranium substantially at the boundaries of the grains, and reacting said precipitated metallic uranium with hydrogen during said cooling at temperatures below about 400°C to form uranium hydride and thereby causing said sintered compacts to disintegrate substantially along the grain boundaries forming substantially equiaxial grains of uranium dioxide of substantially the same size.

2. A process according to claim 1 wherein a grain growth accelerator in an amount ranging from about 0.1 to 1% by weight of the powder is added to said powder before it is compressed into compacts.

3. A process according to claim 2 wherein said grain growth accelerator is selected from the group consisting of aluminum oxide, magnesium oxide, beryllium oxide and titanium dioxide.

4. A process according to claim 1 wherein uranium is admixed with the uranium dioxide or ammonium diuranate powder before it is pressed into compacts.

5. A process according to claim 4 wherein a grain growth accelerator is added to said mixture before it is pressed into compacts.

6. A process according to claim 1 wherein said compacts are cooled initially in an atmosphere of an inert gas until above about 400°C.

7. A nuclear fuel comprised of sintered uranium dioxide having an oxygen to uranium ratio of about 2.00 and being in the form of whole, sinter-grown grains which are free-flowing and substantially equiaxed.

8. A nuclear fuel according to claim 7 wherein said grains range in size from about 60 to 320 microns.

9. A sealed metal tube packed with the product of claim 7.

* * * * *